Dec. 15, 1925.　　　　　　　　　　　　　　　1,565,754
W. G. ORTH
WINDING KEY
Filed May 7, 1923
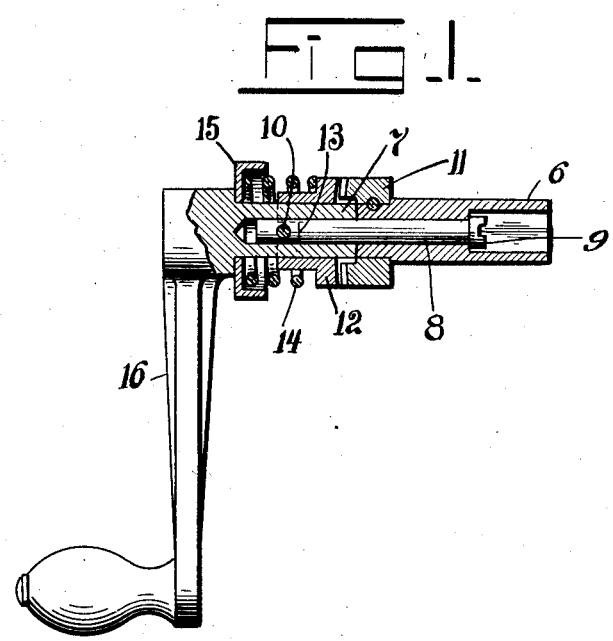
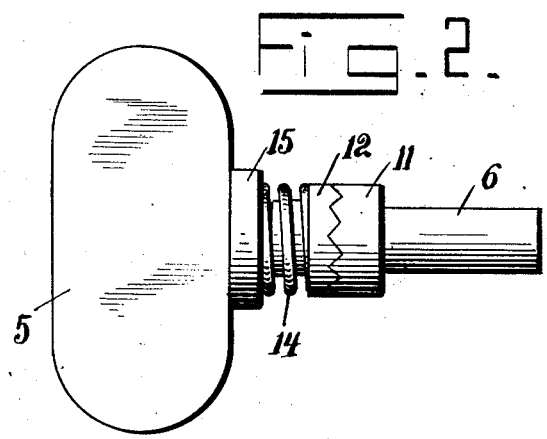
Inventor
Wm. G. Orth.
By A. G. Greene
Attorney Patented Dec. 15, 1925.

1,565,754

UNITED STATES PATENT OFFICE.

WILLIAM G. ORTH, OF DAYTON, OHIO, ASSIGNOR TO OHMER FARE REGISTER COMPANY, OF DAYTON, OHIO, A CORPORATION OF NEW YORK.

WINDING KEY.

Application filed May 7, 1923. Serial No. 637,364.

*To all whom it may concern:*

Be it known that I, WILLIAM G. ORTH, a citizen of the United States, residing at Dayton, in the county of Montgomery and State of Ohio, have invented certain new and useful Improvements in Winding Keys, of which I declare the following to be a full, clear, and exact description.

This invention relates to a key or device which is especially adapted for winding a spring motor such as the spring of a clock, although its utility is not limited to this particular purpose. It is well known that in winding springs or in closing certain types of valves that injury is done to the mechanism or to the value by applying excess force when the spring is fully wound or the valve is fully closed.

The object of this invention is to provide a winding device by means of which it is impossible to apply more than a certain amount of force to the element to be turned, regardless of the pressure which is exerted on the winding handle.

A further object of the invention is to provide a winding device comprising a member adapted to be turned by hand, and a second member adapted to engage the element to be turned, and means for permitting a relative rotation between these members under certain conditions, while retaining them against relative longitudinal displacement.

A further object of the invention is to provide a winding device comprising two distinct parts which are connected by means of a slip clutch.

In the drawings Fig. 1 represents a longitudinal section of a preferred form of my invention. Fig. 2 represents a side elevation of a slightly modified form.

The key or winding device comprises two main parts; a manually operable member 5 and a part 6 adapted to engage the winding stud of a clock or other device which is to be turned. The handle part 5 has rigid therewith, a shank 7 which is bored to receive a stud 8, which stud extends through a similar bore in the spindle 6. The spindle 6 in this form of the invention is recessed to receive the winding stud or other element to be turned, and the stud 8 comprises a head 9 which rests against a shoulder formed at the junction of the recess and the bore containing the stud 8. The stud 8 is held against longitudinal movement and also against rotation with respect to the shank 7 by means of a dowel pin 10 extending therethrough. It will be seen that the headed stud 8 and the dowel pin 10 form a connecting means between the two parts of the key which permits of their relative rotation.

For the purpose of transmitting rotary movement from the handle or finger piece 5 to the spindle 6, the following device is provided.

Rigid with the spindle 6 is a clutch element 11 which is engaged by co-operating clutch element 12 loosely mounted on the shank 7. The ends of the dowel pin 10 are received in slots 13 in an elongated hub integral with the clutch element 12. Clutch element 12 is normally held in contact with the clutch element 11 by means of a coil spring 14 wound about the hub and bearing against a fixed abutment 15. If, however, the resistance to rotation of the spindle 6 becomes excessive, the spring 14 will be compressed and the V shaped teeth of clutch elements 11 and 12 will slide past each other. The spring 14 is, of course, selected with reference to the particular use to which the winding device will be put. If it is desired to wind a very heavy spring, such as those used in the clocks of printing taximeters, a stout spring 14 will be used. If a lighter clock spring or fine valve is to be turned, the spring 14 will be selected accordingly, the selection in any case being such that the proper amount of force may be transmitted to the element to be turned, but when the element has been fully operated and thus offers an increased resistance, the application of a greater force will cause the clutch to slip.

In the embodiment of the invention illustrated in Fig. 1 the finger piece 5 is replaced by a crank 16, otherwise the device is entirely similar to that shown in Fig. 2.

I am aware that in automatic clock winding devices, slip clutches have been used, but as I am the first to incorporate any device for this purpose into a unitary structure adapted for manual actuation, I do not limit myself to the specific form of the invention herein described and illustrated in the drawings, but intend that the invention shall be construed as covering all equivalent devices falling within the scope of the appended claims.

I claim:

1. A winding key comprising a manual member, a second member adapted to engage an element to be turned thereby, said second member being recessed longitudinally and comprising a longitudinal bore in alinement with but of smaller diameter than said recess, a similar bore in said manual member, a headed stud passing through said bores, the head resting in said recess, a dowel pin passing transversely through said stud and said manual member, whereby said manual member and said second member are retained against relative longitudinal displacement.

2. A winding key comprising a manual member, a second member, said second member being recessed longitudinally and comprising a longitudinal bore in alinement with but of smaller diameter than said recess, a similar bore in said manual member, a headed stud passing through said bores the head resting in said recess, a dowel pin passing transversely through said stud and said manual member, a clutch element fixed to said second member, a second clutch element loose on said manual member but retained against rotation relative thereto by said dowel pin.

3. A winding key comprising a manual member, a second member adapted to engage an element to be turned thereby, said second member being recessed longitudinally and comprising a longitudinal bore in alinement with but of smaller diameter than said recess, a similar bore in said manual member, a headed stud passing through said bores the head resting in said recess, a dowel pin passing transversely through said stud and said manual member, a clutch element fixed to said second member, a second clutch element loose on said manual member, said second clutch element comprising an elongated hub, elongated slots in said hub adapted to receive the ends of said dowel pin, thereby retaining said second clutch element against rotation, and a spring normally pressing said clutch elements into engagement but permitting displacement of said second clutch element when the resistance to rotation of said second member exceeds a predetermined amount.

4. A winding key comprising a manual member and a member adapted to engage an element to be turned thereby, means comprising a headed stud extending through alined bores in said members for retaining them against relative longitudinal displacement, and means comprising cooperating clutch elements for normally retaining said members against relative rotation.

5. A winding key comprising a manual member and a member adapted to engage an element to be turned thereby, means comprising a headed stud extending through alined bores in said members for retaining them against relative longitudinal displacement, means comprising a fixed clutch element and a slidable clutch element for normally retaining said members against relative rotation, and a single dowel pin for retaining said stud in one of said members, and retaining said slidable clutch element against rotation.

6. A winding key comprising a manual member, a member adapted to engage an element to be turned thereby, means for normally retaining said members against relative rotation, other means for retaining said members against relative longitudinal displacement, said second means comprising alined bores in said members and a headed stud extending through said bores and held to one of said members by a dowel pin.

In testimony whereof I affix my signature.

WILLIAM G. ORTH.